US012230458B2

(12) United States Patent
Reinmuth et al.

(10) Patent No.: US 12,230,458 B2
(45) Date of Patent: Feb. 18, 2025

(54) MEMS RELAY

(71) Applicant: Robert Bosch GmbH, Stuttgart (DE)

(72) Inventors: Jochen Reinmuth, Reutlingen (DE); Matthew Lewis, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 131 days.

(21) Appl. No.: 18/151,568

(22) Filed: Jan. 9, 2023

(65) Prior Publication Data

US 2023/0223208 A1 Jul. 13, 2023

(30) Foreign Application Priority Data

Jan. 13, 2022 (DE) ..................... 10 2022 200 337.3

(51) Int. Cl.
*H01H 1/00* (2006.01)
*H01H 11/00* (2006.01)

(52) U.S. Cl.
CPC .......... *H01H 1/0036* (2013.01); *H01H 11/00* (2013.01)

(58) Field of Classification Search
CPC ......... Y10S 438/937; H01L 2924/0002; H01L 41/1136; H01H 2059/0027; H01H 2001/0078; H01H 2057/006; H01H 59/0009; H01H 57/00; H01H 11/00; H01H 1/20; H01H 1/0036; H01H 1/00; B81C 2201/0109; B81C 2201/013; B81C 2201/0167; B81C 2201/017; B81C 2203/0136; B81C 2203/0172; B81C 2203/0015; B81C 2203/00365; B81C 2203/00476; B81C 2203/00619; B81C 2203/00626; B81C 2203/00666; B81B 2201/01; B81B 2201/014; B81B 2203/0118; B81B 2203/0315; B81B 2203/04; B81B 3/0072; B81B 3/0021; Y10T 29/42; Y10T 29/435; Y10T 29/49002; Y10T 29/49105;
(Continued)

(56) References Cited

U.S. PATENT DOCUMENTS 8,354,899 B2 * 1/2013 Keimel .............. H01H 59/0009 335/78
2002/0050882 A1 * 5/2002 Hyman ................ H01H 1/0036 335/78
(Continued)

*Primary Examiner* — Anthony R Jimenez
(74) *Attorney, Agent, or Firm* — NORTON ROSE FULBRIGHT US LLP; Gerard A. Messina

(57) ABSTRACT

A MEMS relay. The MEMS relay includes: a movable switching element, on which a second switching surface is arranged in a first end section; a substrate having a first switching surface arranged thereon, which is designed to interact with the second switching surface; a switching electrode, to which an electrical switching voltage may be applied, the movable switching element being able to bring the second switching surface into contact with the first switching surface by way of an electrostatic force generated by the electrical switching voltage; at least one second compensation surface arranged in an end section of the movable switching element opposite the second switching surface; and a first compensation surface, which is designed to interact with the second compensation surface and is galvanically connected to the first switching surface via a cable.

14 Claims, 10 Drawing Sheets

(58) Field of Classification Search

CPC ......... Y10T 29/49121; Y10T 29/49126; Y10T 29/4913; Y10T 29/49155; Y10T 29/5313; G06F 17/5068; G06F 17/5072

USPC .................................................. 200/514, 600

See application file for complete search history.

(56) References Cited

U.S. PATENT DOCUMENTS

2004/0125520 A1* 7/2004 McGruer ............. H05K 9/0067 361/56
2006/0229045 A1 10/2006 Choi et al.

* cited by examiner

MEMS RELAY

CROSS REFERENCE

The present application claims the benefit under 35 U.S.C. § 119 of German Patent Application No. DE 10 2022 200 337.3 filed on Jan. 13, 2022, which is expressly incorporated herein by reference in its entirety.

FIELD

The present invention concerns a MEMS relay. The present invention further concerns a method for producing a MEMS relay.

BACKGROUND INFORMATION

Conventional electromagnetic relays are driven by a magnetic coil, have a certain, non-negligible power consumption when switched on, and are relatively large. Actuation forces are very high and, depending on the design, high electrical voltages and high electrical currents may be switched.

Capacitively driven MEMS relays are also now available. These are significantly smaller and, by reason of the capacitive drive, have a much lower electrical power consumption in the on-state. However, capacitive deflection is capable of generating only low forces. In order to be able to generate sufficiently high forces permitting reasonable contact resistances, this type of relay has to operate with very small gap distances of approximately 1 μm to approximately 2 μm.

If a high electrical voltage is applied to the relay between the input and output, then, on account of the small gap distance, this electrical voltage gives rise to an electrostatic force which, if the electrical voltage is sufficiently high, may lead to an unwanted energizing of the relay. To minimize these forces, the surfaces of the contacts may be made as small as possible, although this increases the resistance of the relay in the on-state. Thus, in this class of relay, a high dielectric strength may only be achieved by increasing the resistance in the on-state.

An object of the present invention is to provide an improved MEMS relay.

SUMMARY

According to a first aspect of the present invention, the object is achieved with a MEMS relay. According to an example embodiment of the present invention, the MEMS relay comprises:

- a movable switching element, on which a second switching surface is arranged in a first end section;
- a substrate having a first switching surface arranged thereon, which is designed to interact with the second switching surface;
- a switching electrode, to which an electrical switching voltage may be applied, the movable switching element being able to bring the second switching surface into contact with the first switching surface by way of an electrostatic force generated by the electrical switching voltage;
- at least one second compensation surface arranged in an end section of the movable switching element opposite the second switching surface; and
- a first compensation surface, which is designed to interact with the second compensation surface and is galvanically connected to the first switching surface via a cable.

In this way, electrostatic forces on the switching element forming as a result of electrical voltages are able to offset one another by way of the compensation electrodes and remain largely ineffective. A high level of operational safety of the MEMS relay is thus supported.

Advantageously, a high dielectric strength with respect to ESD spikes may be achieved for the MEMS relay in this way. The provided MEMS relay is advantageously also designed to be robust with respect to higher electrical voltages, however. Contact surfaces may advantageously be made relatively large, and this has an advantageous impact as regards on-state resistance. The MEMS relay may advantageously be actuated with relatively small electrical voltages. The MEMS relay (unlike transistors, for example) advantageously has no electrical leakage currents and is thus particularly beneficial for applications that require precision switching (e.g., safety-critical applications). For example, the MEMS relay may be used for switch matrices in test systems.

According to a second aspect of the present invention, the object is achieved with a method for producing a MEMS relay. According to an example embodiment of the present invention, the method includes: providing a movable switching element, on which a second switching surface is arranged in a first end section; providing a substrate having a first switching surface arranged thereon, which is designed to interact with the second switching surface; providing a switching electrode, to which an electrical switching voltage may be applied, the movable switching element being able to bring the second switching surface into contact with the first switching surface by way of an electrostatic force generated by the electrical switching voltage; providing at least one second compensation surface arranged in an end section of the movable switching element opposite the second switching surface; and providing a first compensation surface, which is designed to interact with the second compensation surface and is galvanically connected to the first switching surface via a cable.

Preferred developments of the MEMS relay of the present invention are disclosed herein.

In an advantageous development of the MEMS relay according to the present invention, the cable is arranged at least partly outside the MEMS relay.

In further advantageous developments of the MEMS relay according to the present invention, the movable switching element is designed as a symmetrical or asymmetrical rocker element. Various design options for the MEMS relay are advantageously possible here. Advantageously, process variations may be taken into consideration in this way, saving space, for example, so that more MEMS relays may be produced per unit area.

In a further advantageous development of the MEMS relay according to the present invention, the switching surfaces are substantially the same size as the compensation surfaces.

In a further advantageous development of the MEMS relay of the present invention, the MEMS relay further includes a stop element, which is able to strike against a second stop element arranged on the substrate and is designed to prevent an impact between the compensation surfaces. An improved operational characteristic of the MEMS relay is advantageously supported in this way.

In a further advantageous development of the MEMS relay of the present invention, a shorter section of the movable switching element has a first compensation surface which is larger than the first switching surface by a defined amount.

In a further advantageous development of the MEMS relay of the present invention, the MEMS relay additionally comprises a compensation surface which is arranged underneath in a section of the movable switching element containing the second compensation surface and is at the same electrical potential as the movable switching element.

Advantageously, the further compensation surface is able to prevent a force between the rocker element and the compensation electrode, thus improving an operational characteristic of the MEMS relay.

In a further advantageous development of the MEMS relay of the present invention, the first compensation surface is galvanically connected to the first switching surface. An improved operational performance of the MEMS relay is advantageously supported in this way.

In a further advantageous development of the MEMS relay of the present invention, the switching surface and the compensation surface each have two contacts, useful electrical current flowing in through one of the switching surfaces of the first switching surface and flowing out through one of the switching surfaces of the first switching surface.

A kind of double contact that is easily able to prevent the flow of electrical current through the rocker element is created in this way.

In a further advantageous development of the MEMS relay of the present invention, the movable switching element is arranged inside a cap element, the first compensation surface being arranged on an inner side of the cap element.

A kind of hybrid form of the MEMS relay that includes elements of an in-plane movable switching element is created in this way.

In a further advantageous development of the MEMS relay of the present invention, the movable switching element is an in-plane movable element. Advantageously, a structurally different specific embodiment may be created in this way which provides a comb-shaped switching element that is movable in the xy-plane.

In a further advantageous development of the MEMS relay of the present invention, the MEMS relay further comprises isolating elements which are designed to prevent a flow of electrical current through the movable switching element.

In a further advantageous development of the MEMS relay of the present invention, the MEMS relay further comprises a stop element which is designed to prevent contact between the first compensation surface and the second compensation surface.

The present invention is described in detail below with further features and advantages by reference to a number of figures. Identical or functionally identical elements have the same reference signs. The figures are intended in particular to clarify may features of the present invention and are not necessarily drawn to scale. For the sake of clarity, it may be provided that not all reference signs are included in all figures.

Disclosed method features follow by analogy from correspondingly disclosed device features, and vice versa. This means in particular that features, technical advantages and embodiments relating to the method for producing a MEMS relay follow by analogy from corresponding embodiments, features and advantages relating to the MEMS relay, and vice versa.

DETAILED DESCRIPTION OF EXAMPLE EMBODIMENTS

Figure 1:
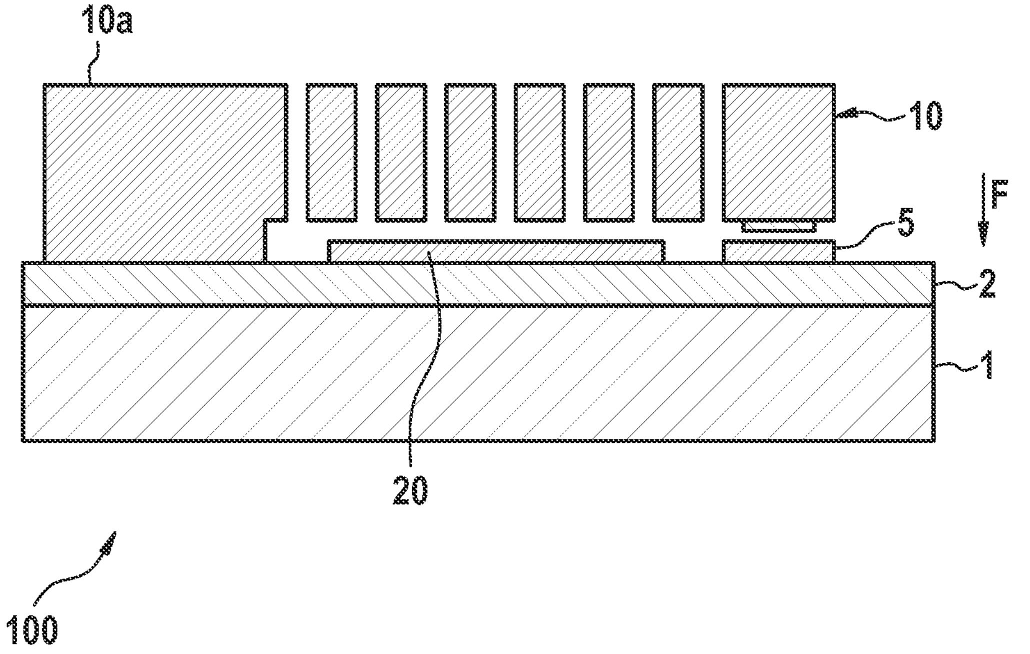
FIG. 1 (RELATED ART)
FIG. 1 shows a cross-sectional view of a conventional MEMS relay.

FIG. 1 shows a cross-sectional view of a conventional micromechanical MEMS relay 100. A switching electrode 20 and an effective electrode 5 formed on a substrate 1 and an oxide layer 2 may be seen. A movable switching element 10 in the form of a spring-like lever structure is arranged above and a distance apart from the two structures 5, 20. If an electrical switching voltage $U_S$ is applied between switching electrode 20 and movable switching element 10, an electrostatic force F is generated between movable switching element 10 and switching electrode 20. This generates an out-of-plane deflection of movable switching element 10, causing movable switching element 10 to be deflected downward or drawn down and movable switching element 10 to make electrically conductive contact with effective electrode 5.

This causes useful electrical current to flow from effective electrode 5 to switching element 10 and on through a suspension device 10*a* for movable switching element 10. The electrical switching voltage $U_S$ applied between switching electrode 20 and movable switching element 10 thus gives rise to the electrostatic force F which draws switching element 10 downward, deflecting switching element 10 and thus causing useful electrical current to flow in MEMS relay 100. Switching electrode 20 and effective electrode 5 are galvanically isolated from each other.

Movable switching element 10 has the potential of the relay input and is generally at ground or frame potential. Electrical switching voltages $U_S$ of between approximately 80 V and approximately 100 V are generally used to switch MEMS relay 100.

The electrical voltage of the signal that is switched by MEMS relay 100 (useful current, useful voltage, useful signal) is, by contrast, usually low; in component ADGM1304 from Analog Devices®, for example, it is limited to +/−6 V. The reason for this limit is that the electrical voltage applied between the contact surface and the lever gives rise to a capacitive force and, if electrical voltages between the input and output of MEMS relay 100 are too high, an unwanted switching operation may occur.

Such an unwanted switching operation may disadvantageously lead to the destruction of the relay, but at the very least the working life of the relay may be greatly reduced as a consequence, since MEMS relays are generally designed for switching a signal in the no-current state. If the MEMS relay is switched inadvertently in the presence of a high electrical voltage, this inevitably leads to a high electrical current, which may destroy the MEMS relay. This may occur unintentionally, for example, due to ESD pulses, i.e., high electrical voltages, which may be caused by electrostatic charging at surfaces, for example.

ESD pulses between the input and output channel may generate a force on the lever element, thus leading to an unwanted switching operation. The force is proportional to the square of the applied electrical voltage, so high electrical voltage pulses may be extremely critical. To reduce this effect, the size of the contact surfaces may be reduced.

However, only a linear reduction in the force is achievable in this way, and the contact resistance may rise if contact surfaces are too small.

To prevent destruction by an ESD pulse, ESD protective structures may be connected in parallel to the relay, although such protective structures are complex and expensive.

It is provided that a further fixed electrode (compensation electrode) be provided in a MEMS relay to offset mechanical forces arising from a voltage difference in the input and output channel.

To this end, for example, a rocker arrangement with a counter-electrode that is preferably arranged symmetrically on the second side of the rocker is proposed.

An arrangement with a counter-electrode that is preferably arranged symmetrically on the second side of the lever is also possible. Furthermore, the present invention proposes providing galvanic isolation in the lever arm between the contact region and the region above the fixed electrode, in order thus also to achieve independence from voltage differences between the input and the first electrode.

Figure 2:
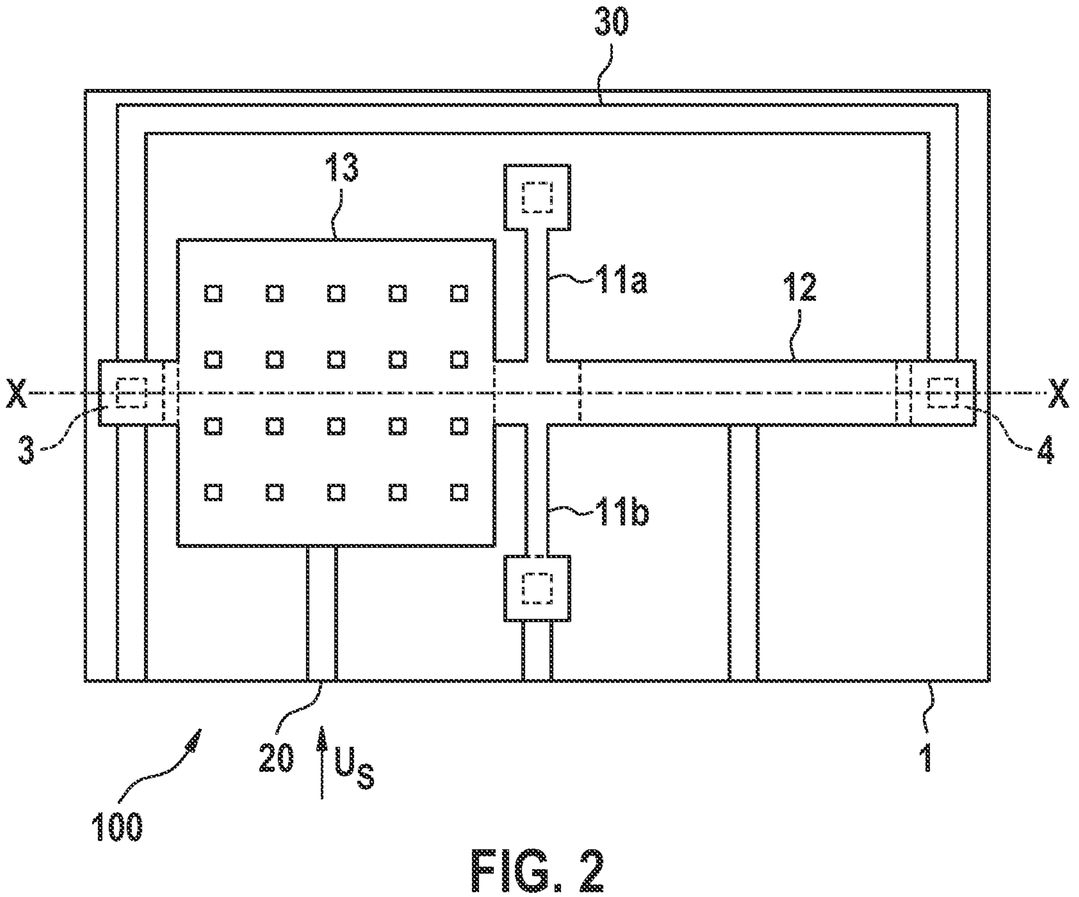
FIGS. 2-12 show views of various specific example embodiments of a MEMS relay of the present invention.

FIG. 2 shows a top view onto a first specific embodiment of proposed MEMS relay 100 in the form of an out-of-plane sensor. Movable switching element 10 is designed in this case as a rocker, which is anchored to a substrate 1 by two torsion springs 11*a*, 11*b*. It may be seen that a first switching surface 3 of MEMS relay 100 is arranged below a first (left-hand) end section of the rocker. A first compensation surface 4, which represents a counter-electrode to first switching surface 3, is arranged below a second (right-hand) end section of the rocker.

On account of the fact that first switching surface 3 is galvanically conductively connected to first compensation surface 4 by way of a connecting cable 30, first compensation surface 4 is generally always at the same electrical potential as first switching surface 3. Alternatively, connecting cable 30 may also be formed at least partly outside MEMS relay 100 (not shown).

A switching electrode 20, to which the electrical switching voltage $U_S$ is applied, may be seen in this case too. As a consequence, an electrostatic force F causes a section 13 of movable switching element 10 to contact first switching surface 3, and useful electrical current flows from first switching surface 3 through movable switching element 10 and torsion springs 11*a*, 11*b* for further use. No electrical contact is made with first compensation surface 4, which serves only to provide an equilibrium of forces between first switching surface 3, first compensation surface 4 and movable switching element 10 on account of electrical voltage spikes acting on connecting cable 30.

It may be favorable for movable switch element 10 in the form of the rocker to be made symmetrical in relation to torsion springs 11*a*, 11*b*, in other words for, in particular, a rocker geometry, a distance to the rotational axis of torsion springs 11*a*, 11*b* and distances between the rocker and the respective mating surface anchored to substrate 1 to be made identical, so as to achieve in this way an optimum compensation of forces acting on the rocker.

Furthermore, it may be favorable to provide a further compensation surface 50, at the same electrical potential as movable switching element 10, below rocker section 12, so that, advantageously, no electrostatic forces on movable switching element 10 may develop in this region.

In an advantageous variant it may be provided that movable switching element 10 in the form of the rocker is made completely symmetrical, in order to be as insensitive as possible to externally applied accelerations.

Figure 3:
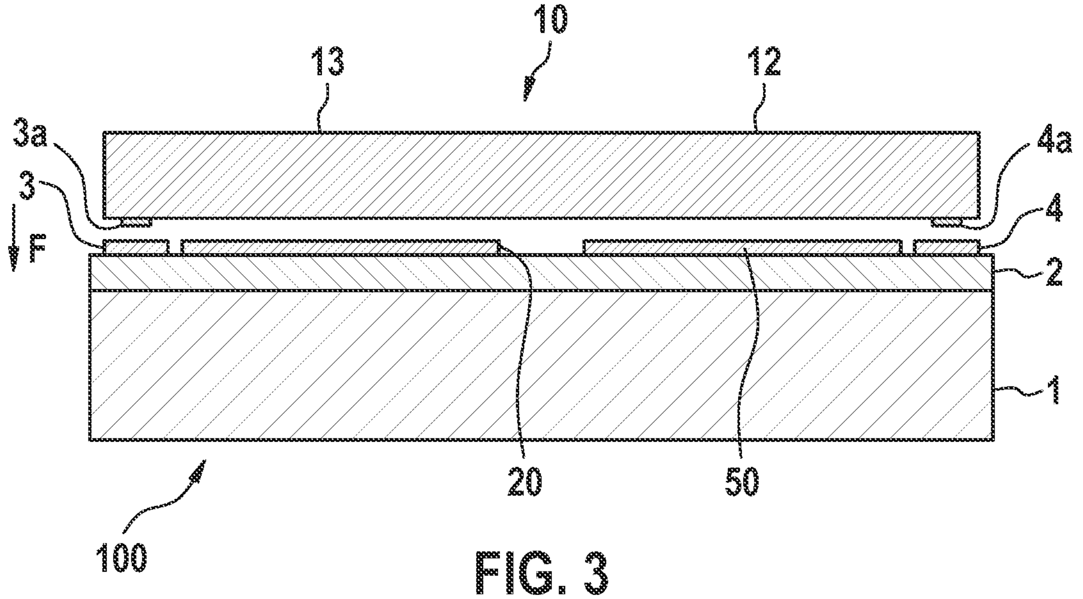

FIG. 3 shows the arrangement of MEMS relay 100 from FIG. 2 in a cross-sectional view along a section line X-X from FIG. 2. Advantageously, first compensation surface 4 does not come into contact with second compensation surface 4*a* arranged on movable switching element 10. Second compensation surface 4*a* is galvanically conductively connected to second switching surface 3*a* (not shown), but in a variant it may also be provided that second compensation surface 4*a* is not galvanically connected to second switching surface 3*a*.

Figure 4:
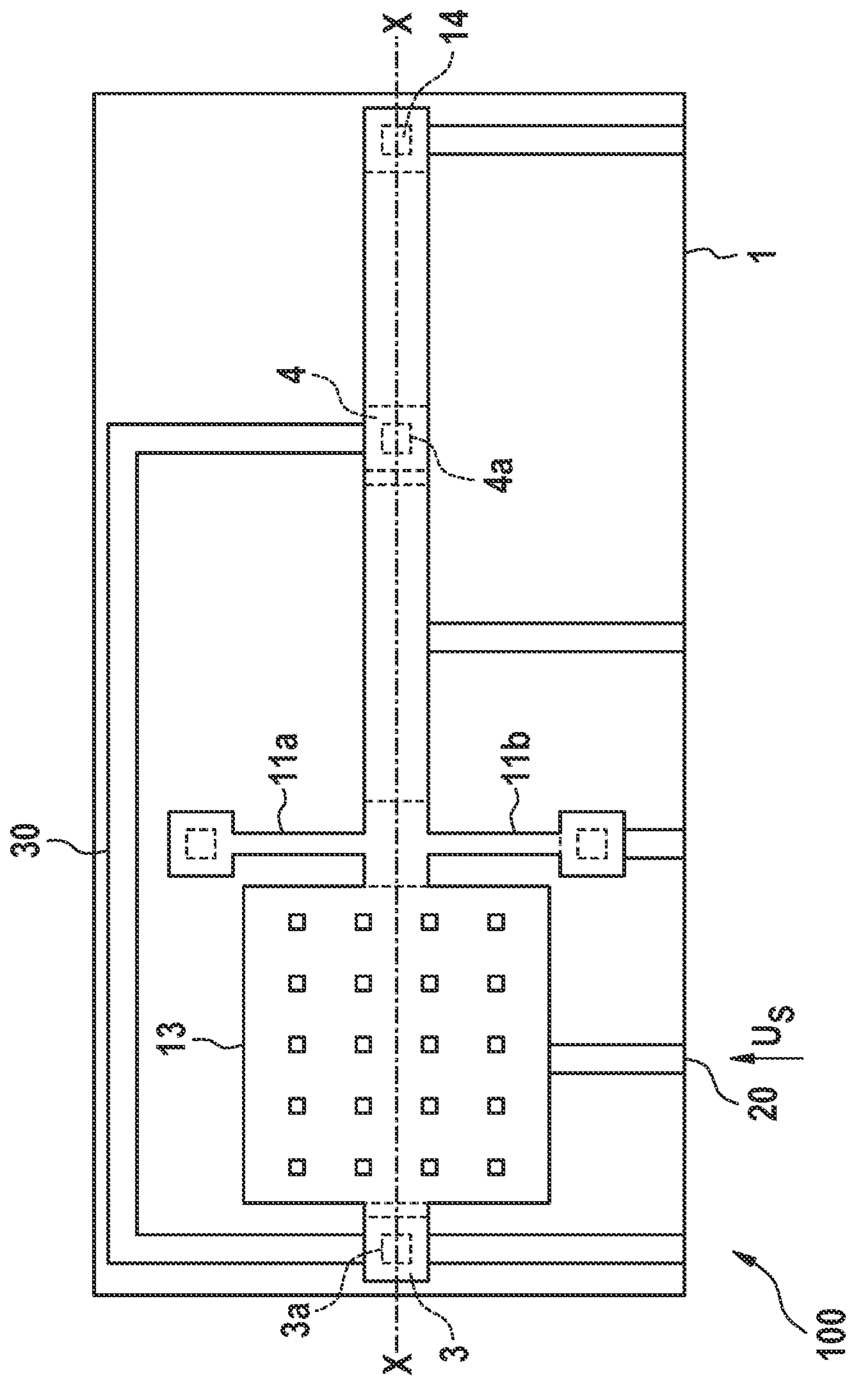
Figure 5:
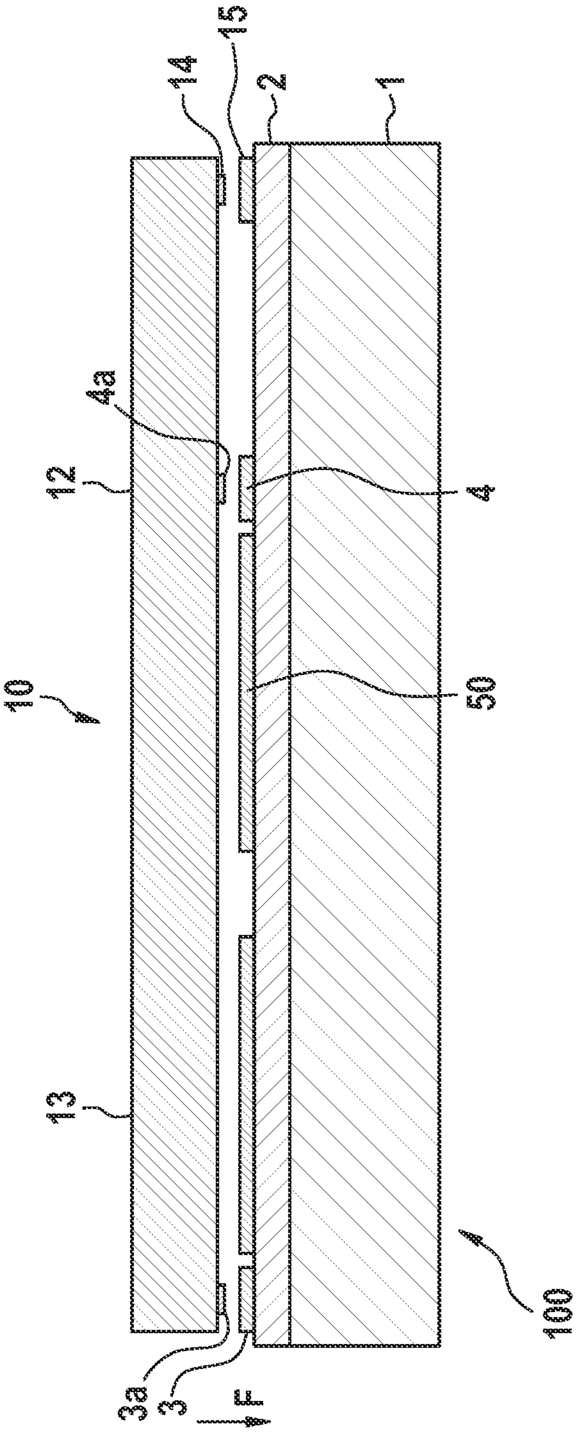

FIGS. 4 and 5 show views of a further specific embodiment of proposed MEMS relay 100, which is of a similar design to that of FIGS. 2 and 3. To minimize the risk of an undesired electrical contact in the region of first compensation surface 4, rocker section 12 in this arrangement is extended on the side of first compensation surface 4 and includes a stop element 14, which limits the movement of rocker section 12. This prevents the possibility of unintended contact in rocker section 12 between first compensation surface 4 and second compensation surface 4*a*.

In this variant too, it may be favorable to provide further compensation surface 50, which is at the same electrical potential as the rocker, below the stop region of stop element 14, to prevent forces from developing in this region. Compensation surface 50 is in this case galvanically connected by connecting cable 30 (not shown).

Figure 6:
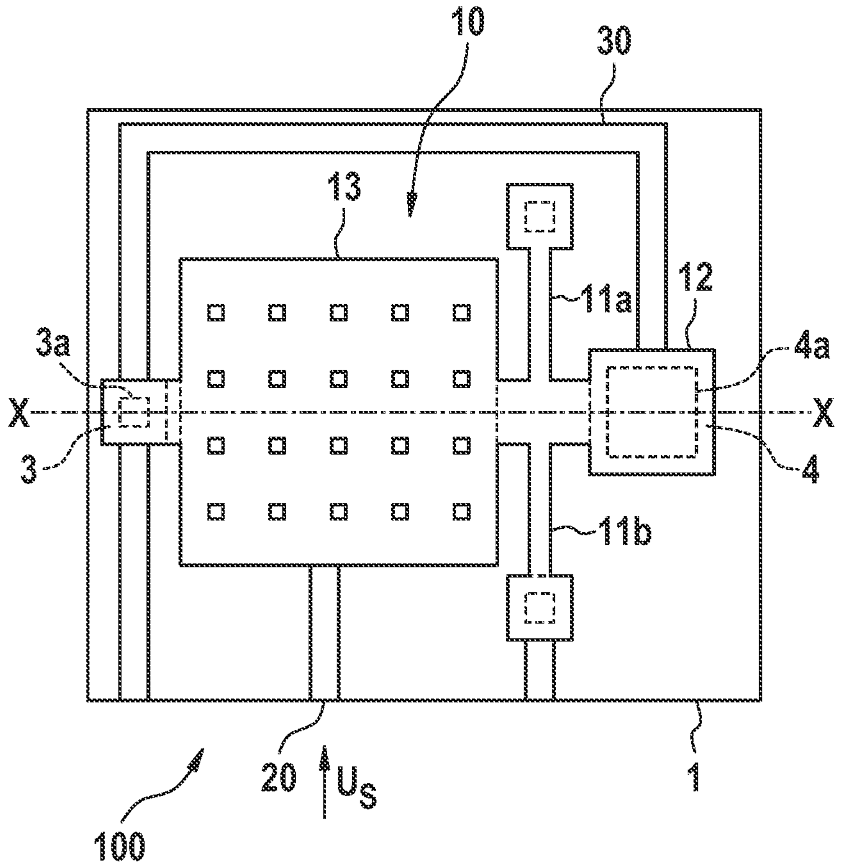
Figure 7:
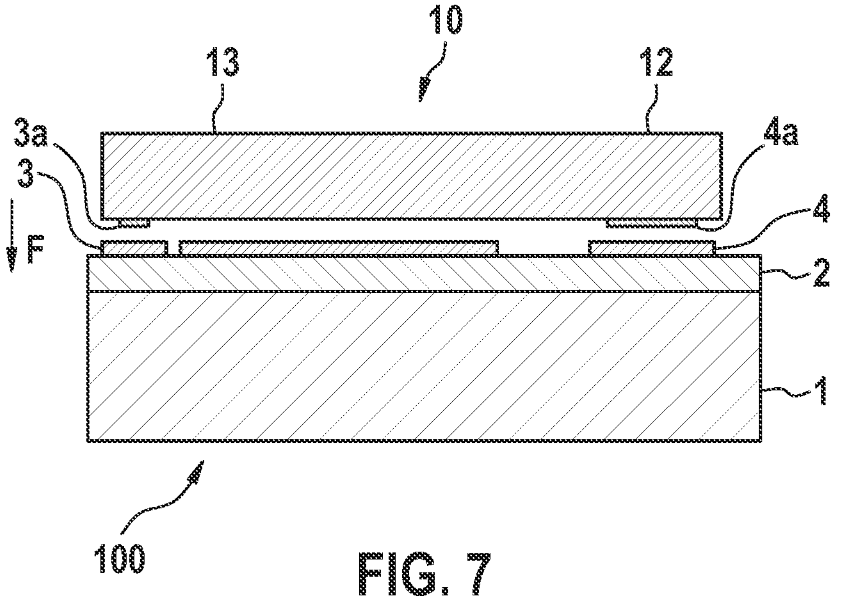

The top view in FIG. 6 and the cross-sectional view in FIG. 7 show a further specific embodiment of a proposed MEMS relay 100, which advantageously takes up little space. In the top view it may be seen that rocker-like movable switching element 10 is asymmetrical in design, left-hand rocker section 13 being larger in area than right-hand rocker section 12. A force equilibrium between rocker sections 12, 13 and elements 3, 4 may be provided in this way.

In this variant too, useful electrical current flows from first switching surface 3 through the rocker and torsion springs 11*a*, 11*b* for further use. First compensation surface 4 is in this case arranged asymmetrically to first switching surface 3 relative to the rotational axis with torsion springs 11*a*, 11*b*. The shorter distance to the torsion axis 11*a*, 11*b* is offset by a larger surface area of first compensation surface 4 in comparison to first switching surface 3, in order once more to achieve an equilibrium of forces within the rocker if a high electrical voltage is applied to connecting cable 30. Alternatively or also in addition to the larger surface area of first compensation surface 4, it is also possible to reduce the distance between elements 3, 4 in order to achieve an equilibrium of forces.

Figure 8:
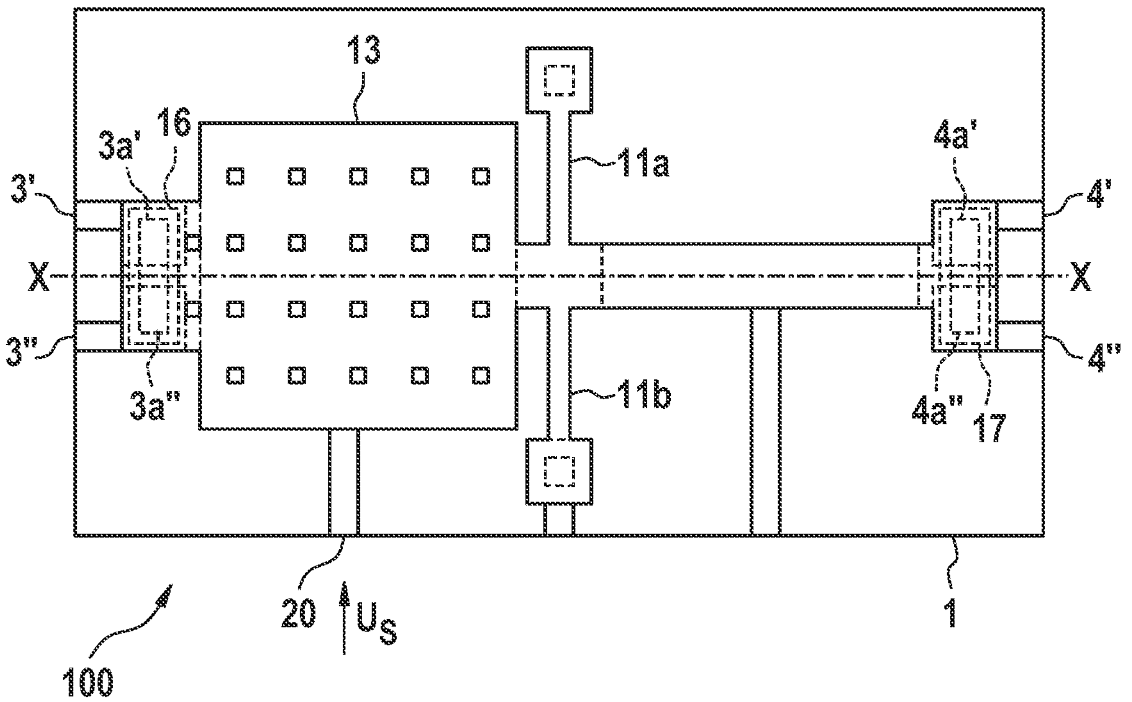
Figure 9:
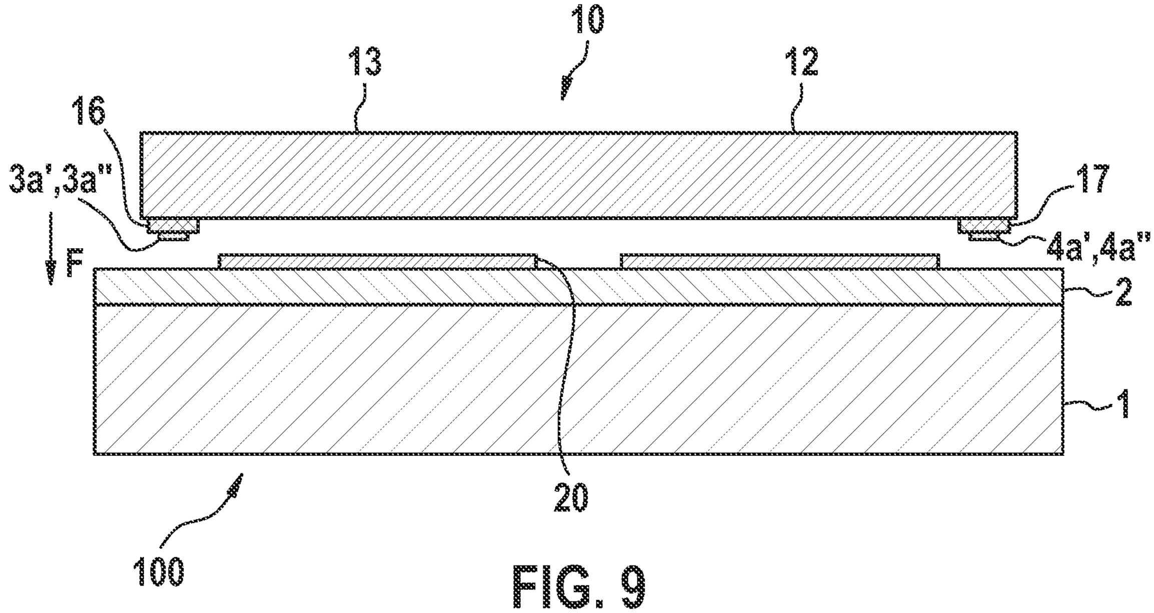

The top view in FIG. 8 and the cross-sectional view in FIG. 9 show a variant of proposed MEMS relay 100 in which the two elements 3, 4 are each formed in two parts, with two switching surfaces 3', 3" for first switching surface 3 and with two compensation surfaces 4', 4" for first compensation surface 4. Second compensation surfaces 4*a*', 4*a*" and second switching surfaces 3*a*', 3*a*" on movable switching element 10 are designed in an analogous way.

Furthermore, electrical isolation is provided between the contact and drive regions and the region of the two-part elements 3, 4. This is achieved by way of isolating elements 16, 17, which are arranged below the rocker, above the two-part elements 3, 4 respectively. When MEMS relay 100 is switched on, useful electrical current flows from switching surface 3' through movable switching element 10 and switching surface 3", the electrical current direction also being reversible. Switching surfaces 3', 3" are electrically conductively connected to compensation surfaces 4', 4" by a connecting cable 30 (not shown).

As a result, in this arrangement too, an equilibrium of forces is achieved between movable switching element 10 and elements 3', 3" or 4', 4" on application of an electrical voltage, as a consequence of which, for example, electrical interference spikes are unable to adversely affect an operational performance of MEMS relay 100.

This variant may be favorable if, for example, torsion springs 11*a*, 11*b* have poor electrical conductivity. In the case of soft and thin torsion springs 11*a*, 11*b*, a low on-state resistance may be used in this way. The rocker must be at a defined electrical potential with respect to switching electrode 20, and so movable switching element 10 is set to a defined electrical potential by torsion springs 11*a*, 11*b*. In this way, rocker-like switching element 10 is used only for the switching operation; the rocker is not involved in the actual flow of useful electrical current, however.

Movable switching element 10 is preferably held at ground potential and the electrical switching voltage $U_S$ is applied to switching electrode 20. However, the reverse case is also possible, i.e., where switching electrode 20 is held at ground potential and movable switching element 10 is set to the electrical switching voltage $U_S$. Isolating elements 16, 17 may be formed in a horizontal isolating layer below the rocker, for example.

Figure 10:
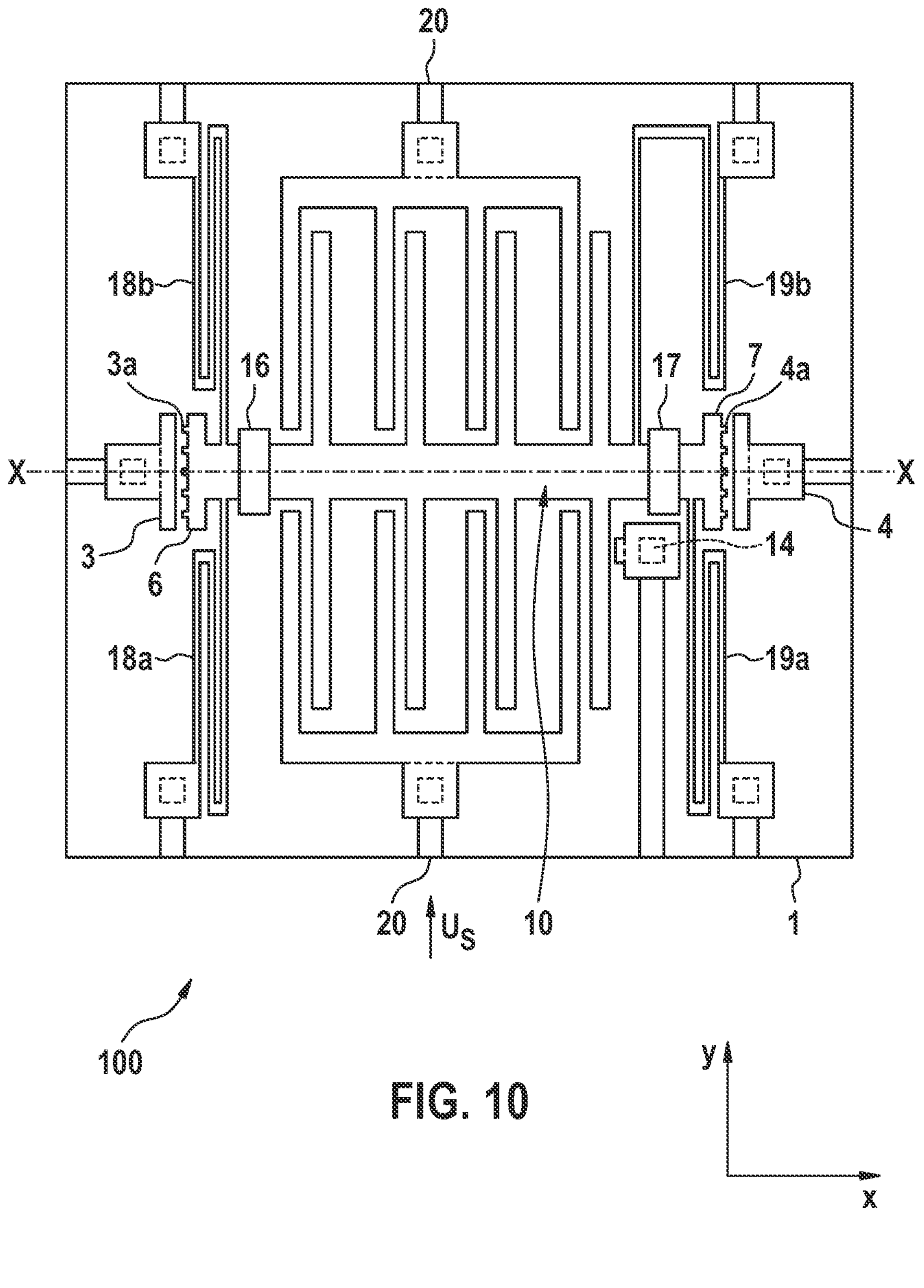
Figure 11:
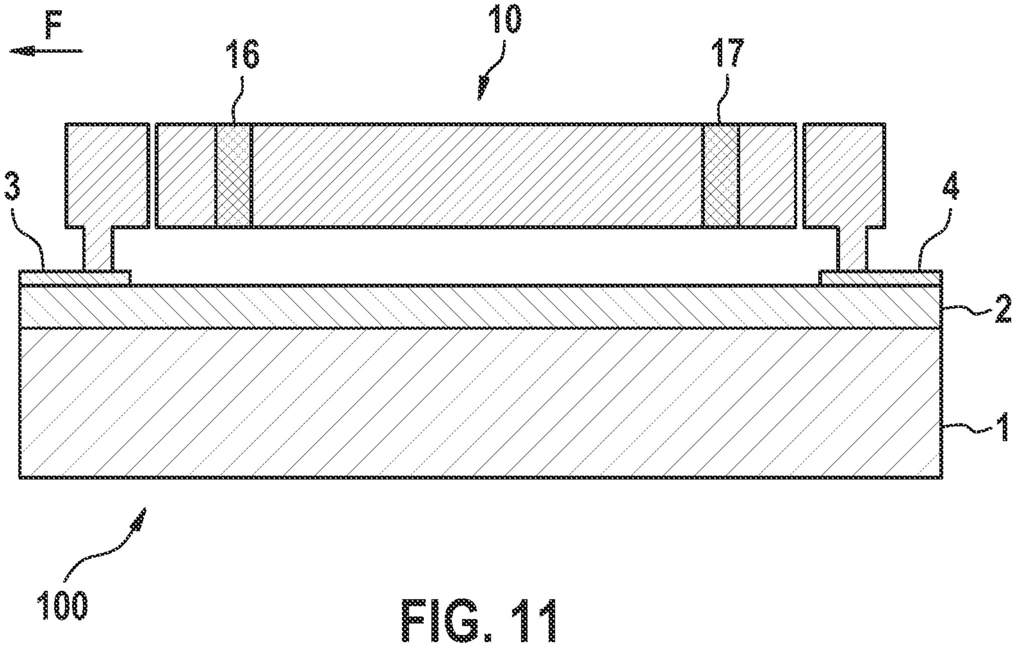

FIGS. 10 and 11 (FIG. 10: top view; FIG. 11: cross-sectional view along a section line X-X) show a further specific embodiment of proposed MEMS relay 100, an in-plane movement of movable switching element 10 being provided in this case.

Movable switching element 10 is movable here in the xy-plane. Movable switching element 10 is suspended parallel to substrate 1 by spring elements 18*a*, 18*b*, 19*a*, 19*b*, which are anchored to substrate 1, movable switching element 10 being movable by way of drive combs. First compensation surface 4, which is arranged against the envisaged direction of movement of comb-shaped switching element 10 and is galvanically connected to first switching surface 3 (not shown), serves as a compensation structure.

The left-hand stop of movable switching element 10 is provided at a stop element 6, useful electrical current flowing from first switching surface 3 through spring elements 18*a*, 18*b* for further use of MEMS relay 100. The electrical switching voltage $U_S$ is applied to switching electrode 20.

Thus, when MEMS relay 100 is operating correctly, only contact at the left-hand side of MEMS relay 100 is desirable, and so only a leftward in-plane movement of the structure is possible and useful electrical current flows only in the left-hand section through stop 6 and springs 18*a*, 18*b*. The compensation of forces in the event of voltage spikes takes place on the right-hand side of MEMS relay 100 by way of first compensation surface 4.

In this variant too, electrical isolating elements 16, 17 may be provided inside movable switching element 10, so that no additional switching forces or forces that oppose the switching operation are generated in the event of electrical voltages at the input channel of MEMS relay 100.

Moreover, in this arrangement as in the arrangement in FIGS. 4 and 5, a stop element 14 may be provided which limits the rightward movement of movable switching element 100, to prevent the possibility of unintended contact between first compensation surface 4 and second compensation surface 4*a*.

Figure 12:
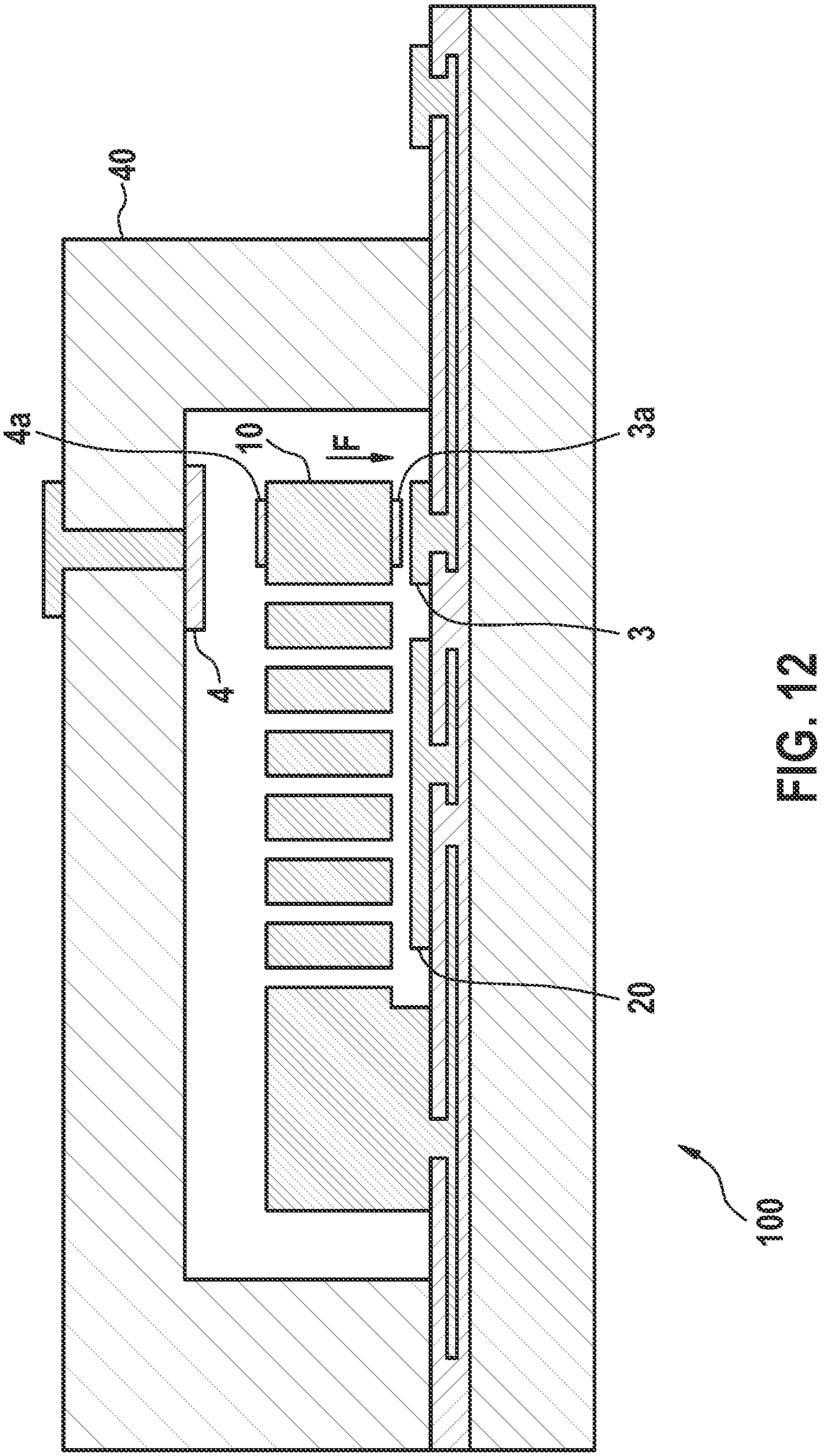

FIG. 12 shows a cross-sectional view of a further specific embodiment of proposed MEMS relay 100. An out-of-plane MEMS relay may be seen, in which the movable structure is protected by a cap element 40. In this case, compensation on the opposite side of movable switching element 10 is achieved by way of first compensation surface 4. In this variant, useful electrical current flows in the same way as in the conventional arrangement shown in FIG. 1.

On account of the greater distance, first compensation surface 4 is thus made larger in order to achieve the force compensation. Arranging first compensation surface 4 on the inside of the cap facing the movable structure is favorable for such arrangements. Although arranging first compensation surface 4 on the inside of the cap may involve additional work, this is offset by the smaller size of the out-of-plane MEMS relay. This variant is favorable if, for example, a particularly compact design of MEMS relay 100 is desirable. For the purpose of force compensation, the electrical potential applied to first switching surface 3 is also applied to first compensation surface 4, resulting in an "upward" force compensation.

Advantageously, proposed MEMS relay 100 is largely insensitive to electrical voltage pulses. Advantageously, ESD protective structures are therefore unnecessary for proposed MEMS relay 100 and a particularly simple capacitive relay may be provided which operates without a charge pump. Such relays are understood in particular to be those which operate with low electrical control voltages.

Proposed MEMS relay 100 advantageously has a much lower energy consumption than conventional electromechanical relays.

Figure 13:
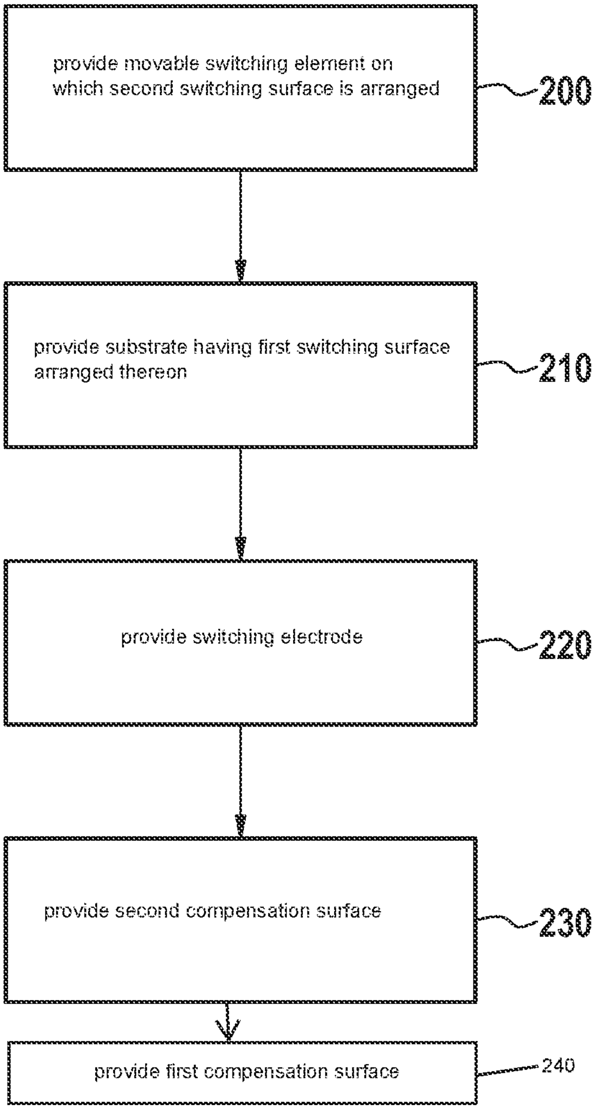
FIG. 13 shows a general work flow of a method for producing a MEMS relay, according to an example embodiment of the present invention.

FIG. 13 shows a general work flow of the proposed method for producing a proposed MEMS relay 100.

A step 200 involves providing a movable switching element 10, on which a second switching surface 3*a* is arranged in a first end section.

A step 210 involves providing a substrate 1 having a first switching surface 3 arranged thereon, which is designed to interact with second switching surface 3*a*.

A step 220 involves providing a switching electrode 20, to which an electrical switching voltage $U_S$ may be applied, movable switching element 10 being able to bring second switching surface 3*a* into contact with first switching surface 3 by way of an electrostatic force F generated by the electrical switching voltage $U_S$.

A step 230 involves providing at least one second compensation surface 4*a* arranged in an end section of movable switching element 10 opposite second switching surface 3*a*.

A step 240 involves providing a first compensation surface 4, which is designed to interact with second compensation surface 4*a* and is galvanically connected to first switching surface 3 via a cable 30.

Although the present invention has been described above with reference to specific exemplary embodiments, a person skilled in the art may also implement specific embodiments that are not described or are only partly described above, without departing from the essence of the present invention.

What is claimed is:

1. A microelectromechanical system (MEMS) relay, comprising:

a movable switching element, on which a second switching surface is arranged in a first end section;

a substrate having a first switching surface arranged thereon, which is configured to interact with the second switching surface;

a switching electrode, which is configured for an application of an electrical switching voltage, the movable switching element being able to bring the second switching surface into contact with the first switching surface by way of an electrostatic force generated by the electrical switching voltage;

at least one second compensation surface arranged in an end section of the movable switching element opposite the second switching surface; and a first compensation surface, which is configured to interact with the at least one second compensation surface and is galvanically connected to the first switching surface via a cable.

2. The MEMS relay as recited in claim 1, wherein the cable is arranged at least partly outside the MEMS relay.

3. The MEMS relay as recited in claim 1, wherein the first compensation surface is galvanically connected to the first switching surface.

4. The MEMS relay as recited in claim 1, wherein the first switching surface and the first compensation surface each have two surfaces, an electrical current flowing in through one of the surfaces of the first switching surface and flowing out through another one of the surfaces of the first switching surface.

5. The MEMS relay as recited in claim 1, wherein the movable switching element is arranged inside a cap element, the first compensation surface being arranged on an inner side of the cap element.

6. The MEMS relay as recited in claim 1, further comprising:

isolating elements configured to prevent a flow of electrical current through the movable switching element.

7. The MEMS relay as recited in claim 1, wherein the movable switching element is a symmetrical or asymmetrical rocker element.

8. The MEMS relay as recited in claim 7, wherein the first and second switching surfaces are substantially the same size as the first and second compensation surfaces, respectively.

9. The MEMS relay as recited in claim 7, further comprising:

a stop element, which is able to strike against a second stop element arranged on the substrate and is configured to prevent an impact between the compensation surfaces.

10. The MEMS relay as recited in claim 7, wherein a shorter section of the movable switching element has the second compensation surface which is larger than the second switching surface by a defined amount.

11. The MEMS relay as recited in claim 7, further comprising:

a further compensation surface which is arranged underneath another section of the movable switching element containing the second compensation surface, and the further compensation surface being at a same electrical potential as the movable switching element.

12. The MEMS relay as recited in claim 1, wherein the movable switching element is an in-plane movable element.

13. The MEMS relay as recited in claim 12, further comprising:

a stop element, which is configured to prevent contact between the first compensation surface and the second compensation surface.

14. A method for producing a microelectromechanical system (MEMS) relay, comprising the following steps:

providing a movable switching element, on which a second switching surface is arranged in a first end section;

providing a substrate having a first switching surface arranged thereon, which is configured to interact with the second switching surface;

providing a switching electrode, which is configured for application of an electrical switching voltage, the movable switching element being able to bring the second switching surface into contact with the first switching surface by way of an electrostatic force generated by the electrical switching voltage;

providing at least one second compensation surface arranged in an end section of the movable switching element opposite the second switching surface; and providing a first compensation surface, which is configured to interact with the at least one second compensation surface and is galvanically connected to the first switching surface via a cable.

* * * * *